(12) United States Patent
Lyon et al.

(10) Patent No.: US 8,957,124 B2
(45) Date of Patent: Feb. 17, 2015

(54) GLAZING

(75) Inventors: Michael Lyon, Bickerstaffe (GB);
Michael Robert Greenall,
Clayton-le-Woods (GB)

(73) Assignee: Pilkington Group Limited, Merseyside (GB)

( * ) Notice: Subject to any disclaimer, the term of this patent is extended or adjusted under 35 U.S.C. 154(b) by 1148 days.

(21) Appl. No.: 11/794,680

(22) PCT Filed: Jan. 6, 2006

(86) PCT No.: PCT/GB2006/000045
§ 371 (c)(1),
(2), (4) Date: Jul. 3, 2007

(87) PCT Pub. No.: WO2006/072797
PCT Pub. Date: Jul. 13, 2006

(65) Prior Publication Data
US 2009/0209673 A1    Aug. 20, 2009

(30) Foreign Application Priority Data
Jan. 6, 2005 (GB) .................................. 0500123.5

(51) Int. Cl.
*B05D 3/06* (2006.01)
*B29C 65/00* (2006.01)
*B32B 7/12* (2006.01)
*C08F 8/00* (2006.01)
*B32B 17/10* (2006.01)

(52) U.S. Cl.
CPC ....... *B32B 17/10036* (2013.01); *B32B 17/1066* (2013.01); *B32B 17/10761* (2013.01); *B32B 17/1099* (2013.01)
USPC ............... 522/2; 156/101; 156/106; 156/327; 525/61

(58) Field of Classification Search
USPC .......... 219/121.69; 156/101, 106, 272.8, 327; 522/2; 525/61, 6
See application file for complete search history.

(56) References Cited

U.S. PATENT DOCUMENTS

| | | | |
|---|---|---|---|
| 5,131,967 A | 7/1992 | Tweadey, II et al. | |
| 6,052,196 A | 4/2000 | Pientka et al. | |
| 6,800,355 B2 * | 10/2004 | Wong | 428/141 |
| 2003/0075531 A1 | 4/2003 | Kupisiewicz | |

FOREIGN PATENT DOCUMENTS

| | | |
|---|---|---|
| DE | 197 00 665 A1 | 7/1997 |
| DE | 100 56 693 A1 | 5/2002 |
| EP | 0 717 459 A | 6/1996 |
| EP | 0 839 644 A | 5/1998 |
| EP | 1 262 747 A | 12/2002 |

OTHER PUBLICATIONS

Helmut et al., machine English translation of EP 0839644, pub. date May 6, 1998.*
PCT/ISA/210.

* cited by examiner

*Primary Examiner* — Michael Pepitone
*Assistant Examiner* — Jessica Roswell
(74) *Attorney, Agent, or Firm* — Buchanan Ingersoll & Rooney PC

(57) ABSTRACT

A laser can be used to modify a glazing 100, 300 so as to improve its suitability for use with a signal-receiving device 350 or a signal-transmitting device 350. This is done by using the laser to provide a region of reduced opacity 110, 202, 340 to the signal within the glazing. Preferably, the laser is be used to reduce the opacity of a selected region 340 of a tinted interlayer in situ. The glazing may be for a vehicle, especially an automotive vehicle.

28 Claims, 5 Drawing Sheets

GLAZING

TECHNICAL FIELD

The present invention relates to a glazing and, in particular, to a glazing that is suitable for use with a signal-detecting or a signal-transmitting device.

BACKGROUND ART

Signal-detecting devices and signal-transmitting devices are well known and are nowadays used increasingly in combination with glazings. This is particularly the case for glazings used in sophisticated, high value products, such as glazings used in automotive vehicles. The devices are positioned on the glazing in the inside of the vehicle, to transmit or receive signals through the glazing.

A signal-detecting device may, for example, be used to detect events or conditions occurring outside an automotive vehicle. The signal may, for example, be used to assess or detect changes in weather conditions (e.g. temperature, pressure, sunlight, rain, fog, mist, snow, ice), noise levels, vibration levels, sound levels, motion, etc. Typical sensors used in automotive vehicles include rain sensors (to activate windscreen wipers in wet weather conditions) and light sensors (to turn on headlights when entering a tunnel).

Alternatively the device may simply be a camera, for providing an enhanced rear view from a vehicle, or another sensor that is useful for monitoring or security purposes. For example, it may be a detector for a signal used to gain access to the vehicle, e.g. for a remote device used for unlocking a vehicle. The possibilities are extensive.

A signal-transmitting device may, for example, be used to transmit a signal allowing a vehicle to be identified or tracked. It may provide an image or display (e.g. for information, advertising or entertainment). It may transmit a light beam. Again, there are very many possibilities.

In some cases both a signal-transmitting device and a signal-receiving device may be used. For example, a signal may be transmitted from a vehicle and bounced back from another vehicle to a signal receiver. By determining the distance between the vehicles it can be determined if the vehicles are a safe distance apart for a given speed. If not, an alarm may be actuated. A similar system may be used to aid in parking a vehicle.

The nature of the signal to be detected or transmitted can vary with the device. The signal may, for example, be visible light, ultra-violet light, infra-red light, another wavelength of electromagnetic radiation, sound, vibration, temperature, pressure, etc., or a change in any of the foregoing. For example, a detector may be used to detect ultra-violet light above a given threshold intensity. Once this intensity has been exceeded a piece of equipment may be triggered (e.g. an alarm, an indicator, a fan or an automatic sun-shade). The precise nature of the signal-detecting and/or signal-receiving device is not crucial, provided that the signal can be detected or transmitted so as to provide a useful function.

Signal transmitting and receiving devices require a minimum optical transmission at various wavelengths in order to function. This is generally not a problem when the device is mounted on either a clear single ply of glass or a laminated glazing comprising a clear interlayer laminated between two plies of clear glass. However, laminated glazings often comprise a tinted or coloured interlayer, in either a shadeband region or throughout the glazing, providing a region which is relatively opaque at certain wavelengths. These relatively opaque regions can interfere with or block completely the transmission of certain signals, reducing the optical transmission below the minimum levels for the devices to function. For this reason signal transmitting/receiving devices are generally used with clear (non-tinted) glazings, or glazings having a slight tint or colour.

Rather than being restricted to using clear glazing with signal transmitting and receiving devices, the present invention allows an alternative approach to be taken.

DISCLOSURE OF INVENTION

The present invention provides a method of modifying a glazing material by reducing its opacity to a signal so as to improve its suitability for use with a signal-receiving device or a signal-transmitting device, comprising using a laser to provide a region of reduced opacity to the signal.

By providing a region of reduced opacity to the signal of a signal receiving or signal transmitting device, the glazing material becomes suitable for use with a device which transmits a signal that was previously blocked by the opacity of the glazing material. This enables tinted glazing materials to be used with various devices which have only previously been available for use with clear glazing materials. The advantage of such a method is that the reduction in opacity can be provided subsequent to the manufacture of the glazing material, such that an existing glazing can be modified to become compatible with a signal receiving or signal transmitting device. For example, a pre-existing automotive glazing, such as a windscreen having a shadeband, can be modified to allow a light sensor to be fitted to the existing glazing. New automotive glazings can also be modified in the same way.

Preferably, the laser is used to provide a region of reduced opacity that extends through the glazing material. The laser may be used to remove a tint in the glazing material, or to reduce the level or intensity thereof.

Preferably, the glazing material is used to form an automotive glazing. The automotive glazing may be for a windscreen, a side window, a door window, a backlight, a rooflight or an interior vehicle component of an automotive vehicle. Alternatively, the glazing material may be used to form a glazing for a building or for a part thereof A glazing comprising the glazing material may be operably associated with the signal-receiving or signal-transmitting device following laser treatment. The signal-receiving device may be mounted to the glazing in a position so that a signal can pass through the laser-treated region and be received by the device; or a signal-transmitting device may be mounted to the glazing in a position so that signal can be transmitted from the device through the laser-treated region. The signal-receiving device may be a rain sensor or a light sensor.

Preferably, the glazing material is an interlayer. Only part of the interlayer may have an opacity to the signal. Preferably, the interlayer is a PVB interlayer. The interlayer may be laminated between two plies of glass to form a laminated glazing. Preferably, the interlayer is modified within the laminated glazing. Alternatively, the glazing material may be a ply of glass.

Preferably, the optical transmission the region of reduced opacity is increased by at least 20% of the optical transmission of the region prior to modifying the glazing material. More preferably, the optical transmission of the region of reduced opacity increases by at least 30% of the optical transmission of the region prior to modifying the glazing material. In this case, the optical transmission is preferably measured at 1000 nm. Even more preferably, the optical transmission of the region of reduced opacity increases by at least 100% of the optical transmission of the region prior to modifying the glazing material. In this case, the optical transmission is preferably measured at 600 nm or 850 nm.

The invention also provides a glazing that has been modified by such methods.

The present invention also provides a glazing that is operably associated with a signal-transmitting or signal-receiving device, wherein the glazing comprises a laser-treated region of relatively low opacity to the signal being received or transmitted, the device being arranged so that the signal can pass through the region of relatively low opacity to the signal when the device is in use.

Preferably, the glazing is a laminated glazing that comprises an interlayer and the laser is used to reduce the opacity of at least part of the interlayer. Preferably, the interlayer is a PVB interlayer.

Alternatively, the glazing may be a single layer of material and the laser is used to provide a region of reduced opacity that extends through said layer.

Preferably, the glazing is an automotive glazing. The glazing may be for a windscreen, a side window, a backlight, a rooflight or an interior vehicle component.

Alternatively, the glazing may be for a building or for a part thereof.

An automotive vehicle, building or part thereof, comprising such glazings, are also provided.

BRIEF DESCRIPTION OF DRAWINGS

The invention will now be described by way of example only, with reference to the accompanying drawings, wherein.

MODES FOR CARRYING OUT THE INVENTION

A glazing comprising a 0.76 mm charcoal grey PVB interlayer laminated between two outer pieces of 2.1 mm thick clear glass was used for initial testing.

Testing was performed using a solid state, pulsed laser. Such lasers are used in the removal of coatings from glass, such as described in US 2003/0075531, and typically operate at 532 nm with a nanosecond pulse time. The spot size, laser power level and pulse frequency are adjusted for the nature of the sample treated.

The sample was treated by scanning a region of the glazing with the laser beam. The laminated glazing may be held in a fixed position and the laser moved, the laser held in a fixed position and the glazing moved, or both moved, to achieve this scanning. The key point is that the laser is set up to move relative to the laminated glazing in a carefully controlled manner. Several parallel passes of the laser relative to the laminated glazing were made. This resulted in corresponding parallel tracks of the laser within a desired region. Each track overlapped slightly with the preceding track (as discussed later). The total area covered was approximately 4 cm by 3 cm. The laser was then switched off. The laser treated laminated glazing was photographed and examined after allowing it to cool to room temperature.

Figure 1:
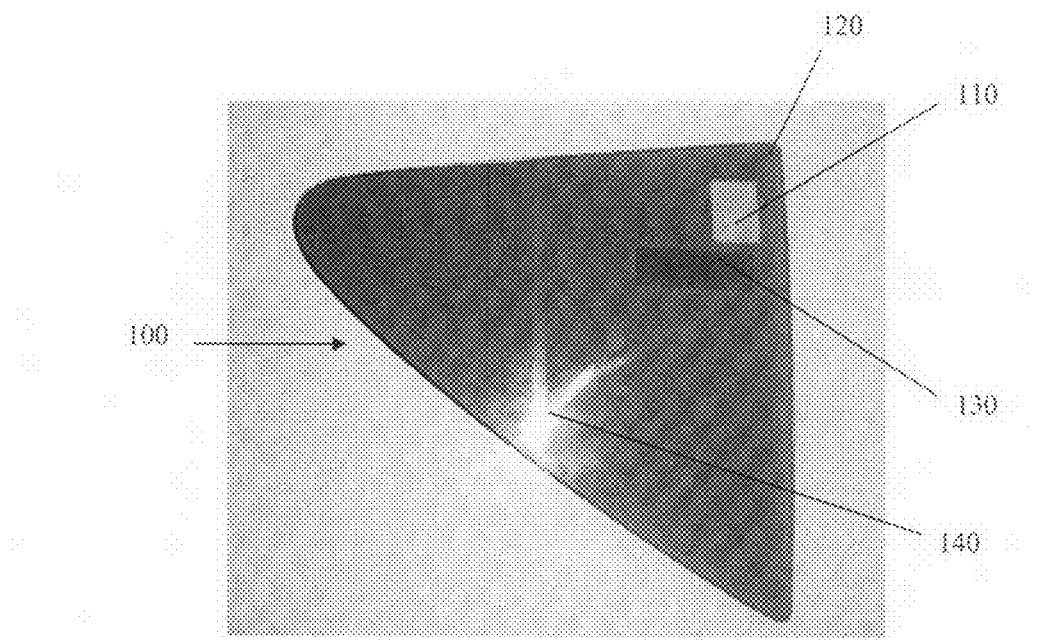
FIG. 1 is a photographic print showing a laminated automotive glazing that has been treated by a method of the present invention.

FIG. 1 is a photographic print of the laser-treated laminated glazing 100. The laminated glazing 100 is in the form of a side window of an automobile. This is slightly curved and generally triangular in shape (sometimes known as a sixthlight). The laser treated region 110 can be seen as a relatively clear, generally rectangular area that is surrounded by a much more opaque region 120. Prior to laser treatment the two regions 110, 120 were of the same opacity and could not be distinguished. A dark rectangle 130 can also be seen, but this does not form part of the experiment and is simply a sticker that was attached to the laminated glazing to identify it. An irregular region can be seen 140, but this is merely the reflection of a flash that was used to take the photograph.

A camera lens was placed against the laser-treated region 110 and it was found that the camera could easily focus through the laser-treated region 110 onto objects that were located to the opposite side of the laminated glazing. The laminated glazing was also placed over some faint text in order to perform a visual assessment. It was found that the text could be read much more easily through the laser-treated relatively clear region 110 than through the opaque region 120.

Given that the interlayer was within a laminated article and it was not possible to treat the interlayer to remove any residue within the interlayer following treatment, it was surprising the result obtained by treating the interlayer in situ was so good. It was concluded that laser-treatment had significantly reduced the opacity of the interlayer and that the laser treated region would be suitable for use with a wide variety of applications involving the transmission or reception of signals.

A number of different tinted interlayers from different manufacturers were laser-treated in situ in sidelight glazing constructions in the same manner as that described. In all cases the laser-treated region showed a significant reduction in opacity.

Figure 2:
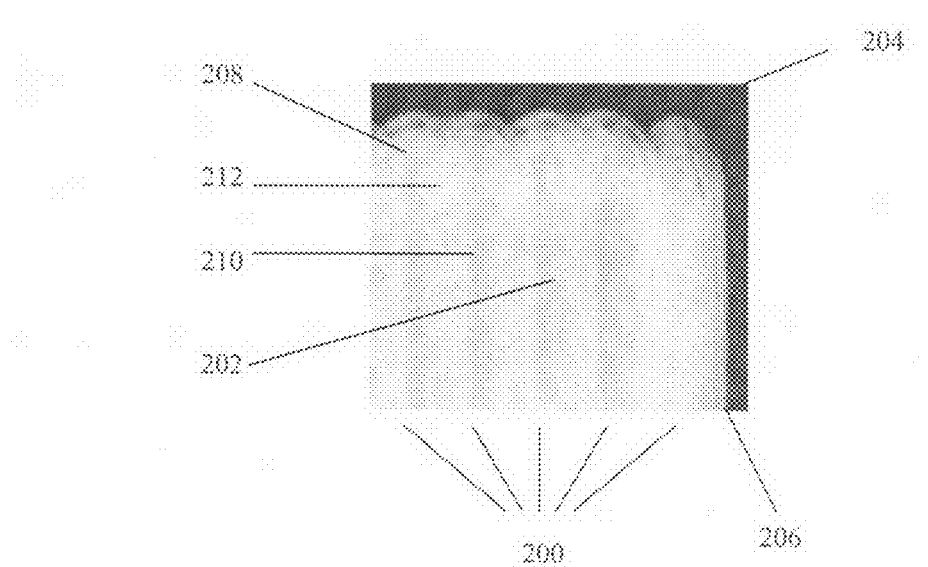
FIG. 2 is a magnified image showing tracks left by a pulsed laser in a laminated automotive glazing that has been treated by the method of the present invention.

FIG. 2 is provided to show further detail of laser tracks produced in an interlayer within a laminated glazing by a method of the present invention. It is a photomicrograph that shows part of a laser-treated interlayer region of a glass PVB laminated glazing. Here five parallel, slightly overlapping tracks 200 are shown. These tracks 200 have produced a relatively clear region 202, when compared with the relatively opaque, non-laser treated, surrounding region 204. At the right hand of the picture a sharp edge 206, which marks the right hand border of the laser-treated region can be seen clearly.

Towards the top of FIG. 2 rounded regions 208 can be seen. These mark the ends of the overlapping tracks 200. If desired, a straight edge could be produced here by masking the laminated glazing during laser treatment with a material through which the laser does not penetrate. Another possibility is to run the laser over the rounded regions 208 in a direction at right angles to the tracks 200 shown. However, such additional procedures are not necessary for most purposes. (Although they may be used for aesthetic reasons if desired.)

Close examination of the laser-treated region shown in FIG. 2 reveals a faint striated pattern. Very light areas 212 can be seen, corresponding to areas where adjacent parallel tracks 200 have overlapped. Intermediate bands 210 that are not quite so light (but are still much lighter than the non-treated part of the interlayer) can also be seen, which form the faint striations. These are regions where there has been little overlap of the laser tracks. If desired, the striated pattern can be avoided by increasing the degree of overlap and/or making additional passes in varying directions (e.g. by running a series of overlapping tracks in one direction and then passing over the area again with tracks at right angles to the original direction). However for most practical purposes the faint striations are not a problem. Indeed they are usually not visible from a distance. They can be left as a useful indication that a region has been laser treated.

Figure 3:
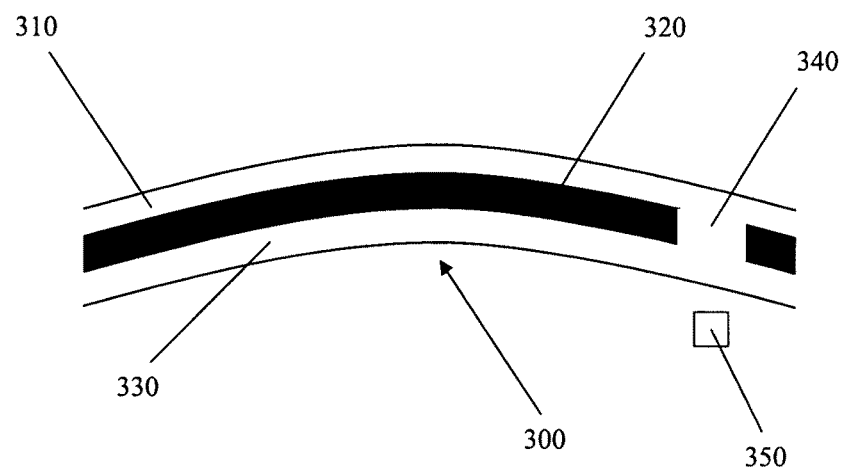
FIG. 3 is a schematic, cross-sectional view of a windscreen that has been treated by a method of the present invention.

Turning now to FIG. 3, a partial cross-section through a windscreen 300 is illustrated schematically. The windscreen 300 comprises an inner 310 and an outer layer 330 of glass and a generally opaque interlayer 320 of synthetic material. However a part 340 of the interlayer 320 has been treated with a laser and is substantially clear. This allows a detector or sensor 350 to be positioned at an appropriate position to detect or send a signal. The detector or sensor 350 can be conveniently mounted to the windscreen 300 by means of adhesive or by a mounting device (not shown).

Figure 4:
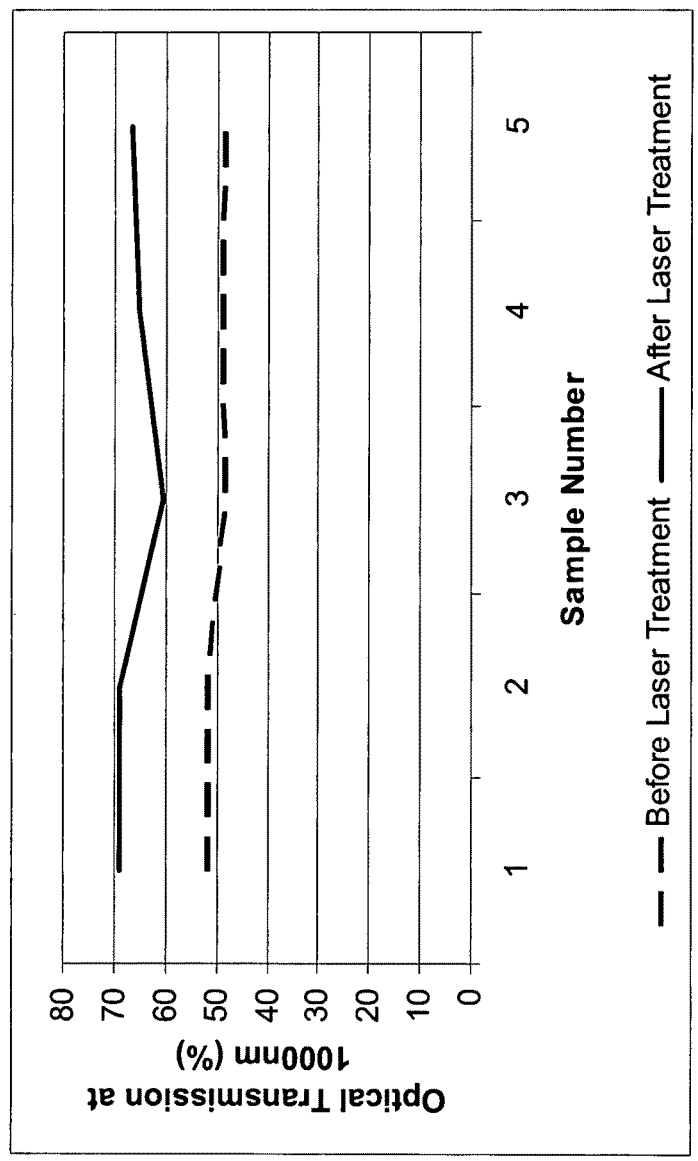
FIG. 4 is a plot of optical transmission for each of samples 1 to 5, both before and after laser treatment, illustrating the change in optical transmission.

Testing was also carried out to determine the change in optical transmission, after laser treatment, in various tinted PVB laminated samples at 1000 nm. Each sample comprised two clear glass plies having the PVB interlayer (nominal thickness 0.76 mm) laminated therebetween. The thickness of the glass plies was 2.1 mm. As before, the laser parameters were chosen to be sufficient to cause decolourisation, but not to cause any degradation in the film quality. Table 1 shows the initial optical transmission, optical transmission after laser treatment, and percentage increase in optical transmission for a series of 5 green-tinted PVB samples. FIG. 4 is a plot of optical transmission for each sample 1 to 5, both before and after laser treatment, illustrating the change in optical transmission. The average percentage improvement in optical transmission was 32.2% with a percentage improvement in optical transmission of up to 37.9% being achieved. The minimum percentage improvement in optical transmission was 24.1%.

TABLE 1

Optical transmission characteristics before and after laser treatment for five samples of laminated green dyed PVB

| Sample | Initial Optical Transmission (%) | Optical Transmission After Laser Treatment (%) | % Improvement in Optical Transmission (100*change/initial) |
|---|---|---|---|
| 1 | 51.7 | 68.9 | 33.3 |
| 2 | 51.9 | 68.8 | 32.2 |
| 3 | 48.5 | 60.2 | 24.1 |
| 4 | 48.9 | 65.2 | 33.3 |
| 5 | 48.3 | 66.6 | 37.9 |

Figure 5:
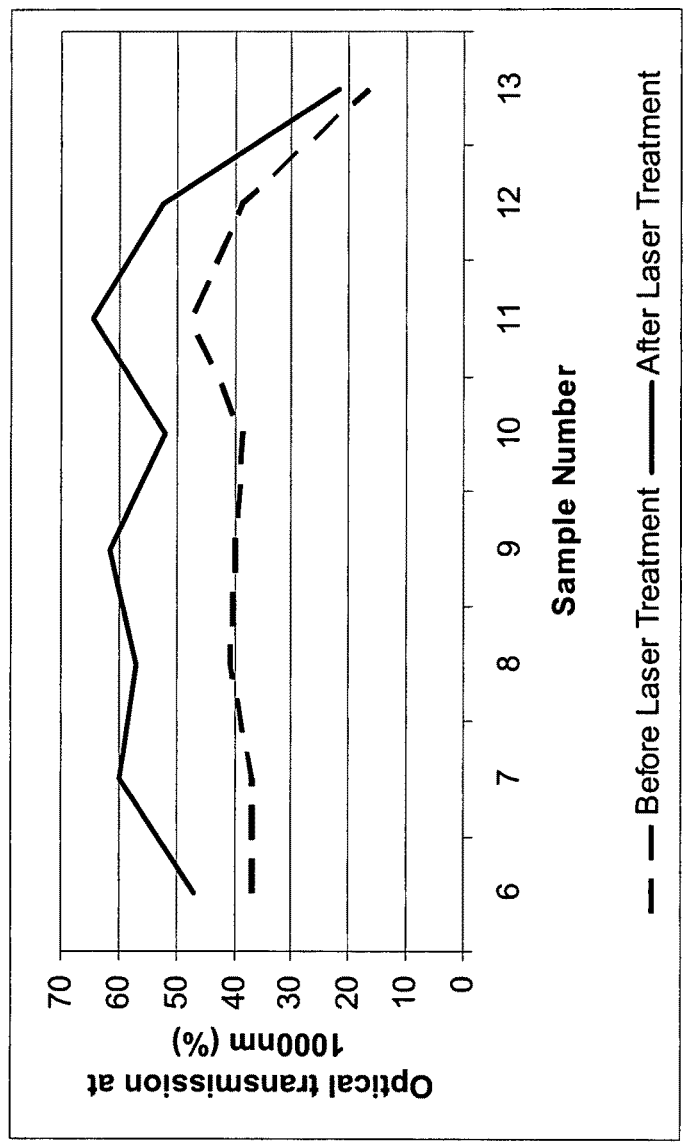
FIG. 5 is a plot of optical transmission for each of samples 6 to 13, both before and after laser treatment, illustrating the change in optical transmission.

Table 2 shows the initial optical transmission, optical transmission after laser treatment, and percentage increase in optical transmission, for seven grey tinted and one grey-blue (sample 7) tinted PVB samples. Again, each sample comprised a layer of PVB (nominal thickness 0.76 mm) laminated between two plies of clear, 2.1 mm thick glass. The laser parameters were chosen to be sufficient to cause decolourisation, but not to cause any degradation in film quality. FIG. 5 is a plot of optical transmission for each sample 5 to 13, both before and after laser treatment, illustrating the change in optical transmission. The average percentage improvement in optical transmission was 41.3% with a percentage improvement in optical transmission of up to 62.3% being achieved. The minimum percentage improvement in optical transmission was 28.3%.

TABLE 2

Optical transmission characteristics before and after laser treatment for eight samples of laminated dyed grey/grey-blue PVB

| Sample | Initial Optical Transmission (%) | Optical Transmission After Laser Treatment (%) | % Improvement in Optical Transmission (100*change/initial) |
|---|---|---|---|
| 6 | 36.7 | 47.1 | 28.3 |
| 7 | 36.9 | 59.9 | 62.3 |
| 8 | 40.6 | 57.1 | 40.6 |
| 9 | 39.9 | 61.5 | 54.1 |
| 10 | 38.5 | 51.8 | 34.5 |
| 11 | 47.5 | 64.4 | 35.6 |
| 12 | 38.7 | 52.5 | 35.5 |
| 13 | 16.4 | 21.8 | 32.9 |

Figure 6:
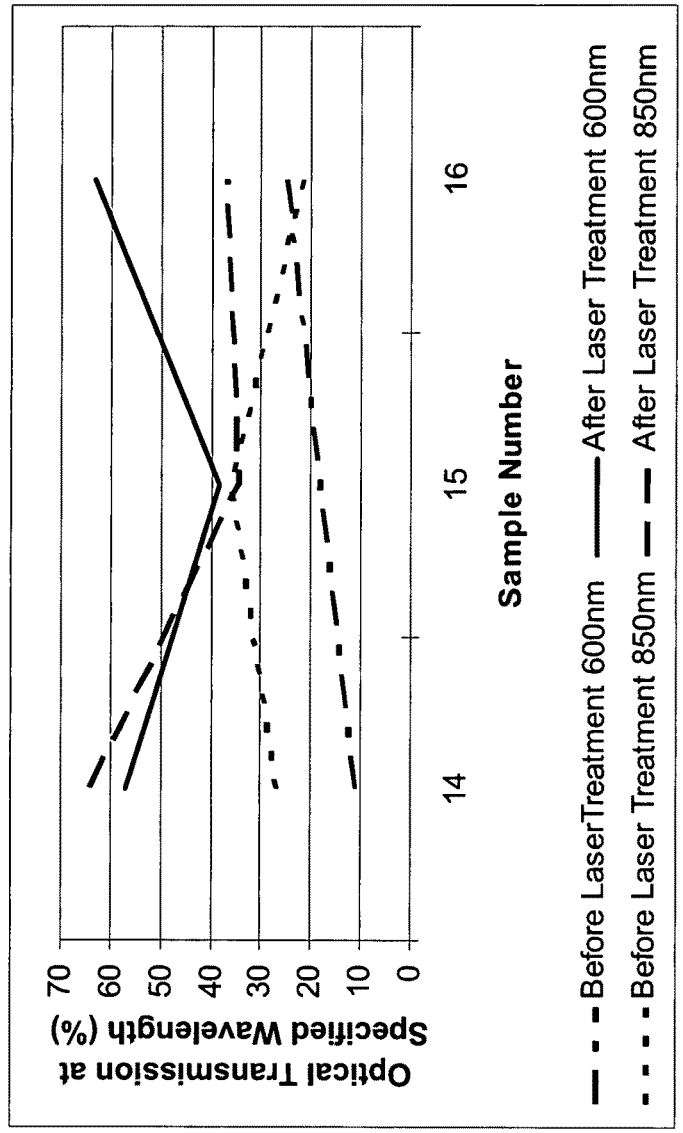
FIG. 6 is a plot of optical transmission for each of samples 14 to 16, both before and after laser treatment, illustrating the change in optical transmission.

The optical transmission of three further samples of the same construction and laser treated in the same manner was measured at 600 nm and 850 nm. Sample 14 comprised a grey PVB interlayer, sample 15 a clear PVB interlayer having a green-tinted shadeband region, and sample 16 a clear PVB interlayer having a grey-tinted shadeband region. Only the tinted regions in samples 15 and 16 were laser treated. FIG. 6 is a plot of optical transmission for each sample 14 to 16, both before and after laser treatment, illustrating the change in optical transmission at 600 nm and 850 nm, as indicated.

TABLE 3

Optical transmission characteristics before and after laser treatment for three samples of laminated dyed PVB Transmission at 600 nm (%)

| Sample | Before Laser Treatment | After Laser Treatment | % Improvement in Optical Transmission (100*change/initial) |
|---|---|---|---|
| 14 | 10.8 | 57.2 | 429.6 |
| 15 | 18.2 | 38.5 | 111.5 |
| 16 | 25.0 | 63.5 | 154.0 |

TABLE 4

Optical transmission characteristics before and after laser treatment for three samples of laminated dyed PVB Transmission at 850 nm (%)

| Sample | Before Laser Treatment | After Laser Treatment | % Improvement in Optical Transmission (100*change/initial) |
|---|---|---|---|
| 14 | 27.0 | 64.4 | 138.5 |
| 15 | 35.8 | 34.7 | −3.1 |
| 16 | 21.5 | 36.8 | 70.4 |

At 600 nm, an improvement of over 100% in optical transmission is achieved. However, at 850 nm, an anomalous result was seen. Although the colour was removed from the interlayer, the region that was laser treated remained opaque, resulting in a drop in optical transmission. This highlights the need to adjust the laser parameters for each type of interlayer and glazing treated.

The optical transmissions achieved above are suitable for use with typical rain and light sensors available for use with automotive glazings. It is therefore possible to use the laser treatment of the present invention to improve the suitability of coloured or tinted laminated glazings for use with rain sensors and light sensors, creating a sensor window within the coloured or tinted PVB region of the glazing.

As an alternative to performing laser treatment on a laminated glazing, in situ, laser treatment may be performed before the interlayer is incorporated into a laminated glazing. This avoids the possibility of delamination (because the laminated glazing is not formed when laser treatment is performed). Once the laser-treated interlayer has been produced it may be stored and packaged. It is a very useful intermediate and may be sold to a manufacturer for later use in providing laminated glazing.

Although the interlayers in the tests described above are of a single, bulk colour throughout the interlayer, some automotive glazings require an interlayer which is clear, in the bulk of the interlayer, and tinted or coloured at one edge. In particular, a region of an interlayer may be tinted towards the top of a glazing. This is often the case for automotive vehicle windscreens and windows in order to reduce glare from overhead sunlight. Alternatively the interlayer may be tinted to provide a border at or around the periphery of a windscreen or window. This is often done to improve the aesthetic appearance of a glazing (e.g. an obscuration band or border may be used to hide adhesive or other securing means) or for functional purposes (e.g. to protect adhesive from exposure to ultraviolet light).

Additional tests were carried out to determine whether a tinted PVB (polyvinyl butyral) interlayer could be decolourised without being in situ within the laminated glazing, using such a clear/tinted interlayer. A clear 0.76 mm thick interlayer, having a light green tinted shadeband was successfully laser treated in accordance with the method of the present invention. A region of reduced opacity, similar in appearance to the untinted main body of the interlayer, was produced.

The interlayer to be treated can be formed of any material, provided that it has a degree of opacity to a signal and that the degree of opacity can be reduced by laser treatment (so that the signal can be better received/transmitted). Typical materials used as interlayers in laminated glazings include polyvinyl acetate (PVA), polyvinyl chloride (PVC), polyvinyl butyral (PVB), polyurethane and acrylates. Tinting material may be incorporated into or onto the interlayer prior to lamination (e.g. by admixing or by printing). Preferably, the interlayer used is PVB.

The present invention is therefore applicable to a variety of glazing materials, including annealed, toughened, tempered, semi-tempered or semi-toughened glass and interlayer materials such as PVB. Other glazing materials include non-glass plies, such as polycarbonate.

In order to determine whether the method of the present invention is suitable for use with laminated glazings containing a mix of PVB and non-PVB interlayers, a laminated glazing having the construction clear glass (2.1 mm)/dark charcoal grey PVB (0.76 mm)/PET substrate with metal film/clear PVB (0.38 mm)/clear glass (2.1 mm), with the metal film being in contact with the layer of clear PVB, was tested. When laser treated with the irradiated being from the tinted PVB side, regions of reduced opacity were successfully produced. When irradiated from the clear PVB side, the metal coating was damaged. In addition to showing that the laser treatment technique of the present invention works with laminated glazings containing non-PVB interlayers, the results indicate that the method may also be used on laminated glazings where one ply is coated, for example, with a solar control coating.

One of the main advantages of the method of the present invention is being able to modify the glazing material after manufacture. In particular, the glazing material can be modified after being formed into a glazing. This is a particular advantage for the modification of existing glazings, in particular automotive glazings, to be used with a sensor or other device which was not previously possible. For example, an existing shadeband in a windscreen can be modified to allow compatibility with a light sensor, without need to purchase a new windscreen in order to install the sensor. Also, other, new, automotive glazings that have previously been found to be incompatible with sensors and other similar devices may be modified to add new functionality.

In any event, the present invention can be used to provide a region of reduced opacity to a signal within a surrounding area which is relatively opaque to the same signal, creating a signal window. This allows far greater flexibility in the positioning of a signal-transmitting or signal-receiving device than was previously the case. It can be used to position such a device close to the edge of a glazing, even if the glazing is normally opaque in these regions. This can be useful in improving signal reception/transmission. It can also be useful for safety reasons, because a device can be easily positioned so as not to interfere with the main field of view of a driver of an automotive vehicle.

The window can be of any desired size and/or shape, but is preferably a substantially regular shape, such as a circle, an oval, or a polygon (e.g. a square or a rectangle). The laser treatment may consist of a series of pulses and therefore the shape will be defined by the outline of an area treated by the laser pulses (as shown in FIG. 2).

If desired, a substance that is relatively resistant to laser penetration (e.g. a heavy metal containing agent) may be used to provide a protective mask during laser treatment. The mask can be arranged to leave a desired circle, oval, polygon, or other shape exposed to the laser. Laser treatment may then occur over the desired area and may overlap the mask to some degree. When the mask is removed the desired shape will remain. The mask may be a mould, a coating, a taped region or any other protective form.

The size and shape of the window should be appropriate for the signal-transmitting or signal-receiving device to function. For example, in the case of a camera to be positioned contacting the window, the size and shape of the window may be predetermined so as to be round and to be the same size/slightly larger then the lens of the camera. Thus the size and shape of the window is preferably specifically adapted to the device.

Desirably, the window that is formed by laser treatment provides an improvement of at least 10% in the intensity or quality of the signal that is received or transmitted (relative to the situation prior to laser-treatment). More desirably, the improvement in signal is at least 20%, at least 30%, at least 50% or at least 100% (when measured either qualitatively or quantitatively). Most desirably, the window is substantially transparent or is substantially translucent to the signal. Thus the signal may pass through it without substantial impairment.

Prior to laser treatment, the interlayer (or a part thereof) may either completely block a desired signal or it may allow a degree of signal transmission through the laminated glazing, but still interfere with or reduce the transmission to an undesirable extent. The term "opaque" should therefore to be interpreted accordingly for the purposes of the present invention. Indeed, the precise degree of opacity of an interlayer to be treated is not crucial provided that laser treatment can improve the transmission of a signal through the interlayer, either qualitatively or quantitatively.

Those skilled in the art of laser technology can select lasers suitable for use in reducing the opacity of a given material to a signal by testing the material at varying wavelengths, intensities and time periods. It can be determined whether given or not the laser treatment has worked by checking whether or not the signal passes through the material with improved efficiency following the laser treatment. A transmitter and/or a receiver for the signal can be used to determine this. Alternatively, this may be done by visual inspection if it is simply desired to improve the transmission of light in the visible spectrum (e.g. if it is simply desired to provide a relatively clear region for use with a camera or other sensor).

The PVB interlayers treated as described above are tinted, normally due to the presence of a known pigment or dye. Dyes used in the manufacture of PVB interlayers are typically liquid, whereas pigments are typically solid. The dye or pigment typically extends throughout the entire thickness of the interlayer, rather being located merely at the surface. However, automotive glazings may contain surface tinted PVB interlayers, where a dye or pigment is applied to the surface only, for example, by printing. In such cases, only this surface tint needs to be decolourised.

Without being bound by theory, it is envisaged that for most pigments opacity can be reduced by using a laser at a wavelength of from 100 nm to 10 µm, e.g. from 300 nm to 3.5 µm. However theses ranges are not at all intended to be limiting and a skilled person can readily determine a suitable range to use for a given tinted interlayer.

A spectrophotometer may be used to select a wavelength of laser light that may be absorbed by the pigment or dye. Once a preferred wavelength has been selected, the intensity and/or duration of laser treatment can be optimised. This should be done bearing in mind the point that the laser treatment should not cause any substantial damage that outweigh the benefits obtained by treatment. Thus, for example, it is preferred that the treatment does not cause substantial delamination (i.e. delamination that would seriously impair the function of the laminated glazing). Delamination can be detected by inspecting a laminated glazing sample following laser treatment (e.g. by eye or with a microscope). If substantial delamination is observed then the duration and/or intensity of laser treatment can be reduced. It is also preferred that the laser treatment does not result in the formation of visible bubbles in the interlayer, especially for applications where aesthetic appearance is important. The laser pulse width, pulse frequency, power and spot size should be adjusted to ensure the intensity and duration of treatment are suitable for the material being treated.

The actual duration of treatment will largely depend upon the area, nature and depth of material to be treated. However, for most applications it is envisaged that, the duration of laser-treatment (per laminated glazing) will be less than 30 minutes. Preferably it is less than 15 minutes, or less than 10 minutes. More preferably it is less than 5 minutes, or less than 3 minutes. Most preferably it is less than 1 minute.

The laser may be used as a parallel beam at a given wavelength. Alternatively the laser can be focussed onto a given region (e.g. onto an interlayer). This can be achieved by using one or more lenses and/or mirrors.

A further important point to note is that the present invention is not limited to a laminated glazing. It can be used to reduce the opacity of a non-laminated glazing to a signal (e.g. to reduce the opacity of a single sheet of tinted glass or other tinted material). The term "glazing material" is therefore used herein in a broad sense. It includes individual panes or sheets of glass, glass laminates, and glass or glass laminated glazing replacements (e.g. plastics materials or other synthetic materials, which are commonly used to replace glass for safety reasons/for ease of manufacture, etc.).

Having described various methods of the present invention, it is important to appreciate that glazings resulting from such methods are also within the scope of the present invention.

The glazings will have physical changes following laser treatment and can therefore be considered to be new articles in the light of the laser treatment. Laser-treated regions within an interlayer can be identified by those skilled in the art. For example, this can be done by microscopic analysis. This may allow the track that a laser has followed to be ascertained. It may even show overlapping circles corresponding to laser pulses. (These can be seen if a pulsed laser is used, but it is also possible to use a continuous laser, which will provide a more continuous tracking pattern). A further characteristic of laser treatment is that the boundary between a laser-treated region and a non-laser treated region will normally be distinct.

In addition to covering the laser-treated glazing per se, the present invention also includes such glazings when operably associated with a device. The device may be a signal-receiving device or a signal-transmitting device, as described previously. Preferably the device is mounted to the glazing. This can be done by any appropriate manner, e.g. by using adhesive, clamps, or other securing means. Desirably, the device is releasably mounted, e.g. by a releasable clamp or fastener, by a hook and eye arrangement (such as Velcro™), or by a sucker formed of resiliently deformable material. In some cases the device may even be integrated into the structure of a glazing. Thus a small detector or transmitter may be located within a laminated article. (If desired, encapsulation techniques can be used.)

It is not however essential for the device to be located on or in the glazing. It may be located at a distance from the glazing. For example, a signal-receiving device may be mounted on top of a vehicle dashboard and may be positioned to receive a signal passing through a laser-treated region of a windscreen or side window. Alternatively, a signal-transmitting device mounted on top of the dashboard may be positioned to transmit a signal through the laser-treated region of the windscreen or side window.

It will be appreciated from the foregoing discussions that a preferred glazing of the present invention is a glazing for use in a vehicle, preferably an automotive vehicle, or a part thereof (e.g. a door, window, or rooflight). The term "automotive vehicle" is used herein to cover any powered mode of transport, but especially to cover terrestrial powered vehicles, (e.g. a car, truck, motorcycle, moped, scooter, lorry, bus, coach, van, tractor, off-road vehicle, farm vehicle, military vehicle, security vehicle, etc.) Thus, the glazing may be a windscreen, a side window or backlight, a rooflight, a light cover, an indicator cover, a reflector, a mirror or any other glazed part of an automotive vehicle, for example an interior vehicle component, such as a dashboard.

A laser-treated glazing of the present invention is not however limited to automotive glazing. The methods described herein can be applied in principle to any form of glazing. For example, they can be applied to a glazing for a locomotive, train or other rail vehicle, or a boat, ship or other water-borne vehicle, or an aeroplane or other aircraft. The methods may equally be applied to a building or a part thereof (e.g. a door, window or roof).

Sophisticated glazing associated with signal-detecting and/or signal transmitting devices is increasingly being used in buildings. Indeed the devices described herein in connection with automotive vehicles (including weather sensors, temperature sensors, UV light sensors, movement sensors, etc.) are used in many buildings. They can be used to control the operation of shutters, shades, opening and closing mechanisms, for security systems, etc.

The invention claimed is:

1. A method of modifying an interlayer which has a tint produced by a dye or pigment by reducing its opacity to a signal so as to improve its suitability for use with a signal-receiving device or a signal-transmitting device using said signal, comprising using a laser to illuminate the interlayer to provide a region of reduced opacity to the signal by removing the tint or reducing the intensity thereof, wherein the laser decolorizes the interlayer without causing any degradation thereof.

2. A method according to claim 1, wherein the laser is used to provide a region of reduced opacity that extends through the interlayer.

3. A method according to claim 1, further comprising operably associating a glazing comprising the interlayer with the signal-receiving or signal-transmitting device following laser treatment.

4. A method according to claim 3, wherein the signal-receiving device is mounted to the glazing in a position so that a signal can pass through the laser-treated region and be received by the device; or wherein the device is a signal-transmitting device that is mounted to the glazing in a position so that signal can be transmitted from the device through the laser-treated region.

5. A method according to claim 3, wherein the signal-receiving device is a rain sensor or a light sensor.

6. A method according to claim 1, wherein the interlayer is a PVB interlayer.

7. A method according to claim 1, wherein only part of the interlayer has an opacity to the signal.

8. A method according to claim 7, wherein the interlayer is laminated between two plies of glass to form a laminated glazing.

9. A method according to claim 8 wherein the interlayer is modified within the laminated glazing.

10. A method according to claim 1, wherein the optical transmission of the region of reduced opacity is increased by at least 20% of the optical transmission of the region prior to modifying the interlayer.

11. A method according to claim 1, wherein the optical transmission of the region of reduced opacity increases by at least 30% of the optical transmission of the region prior to modifying the interlayer.

12. A method according to claim 1, wherein the optical transmission of the region of reduced opacity increases by at least 100% of the optical transmission of the region prior to modifying the interlayer.

13. A method according to claim 10, wherein the optical transmission is measured at 1000 nm.

14. A method according to claim 12, wherein the optical transmission is measured at 600 nm or 850 nm.

15. A glazing that has been modified by a method according to claim 1.

16. A glazing that is operably associated with a signal-transmitting or signal-receiving device, wherein the glazing is a laminated glazing that comprises an interlayer which has a tint produced by a dye or pigment, and wherein the glazing comprises a laser-treated region of relatively low opacity to the signal being received or transmitted where the tint is removed or the intensity of the tint is reduced by illuminating the interlayer with a laser which decolorizes the interlayer without causing any degradation thereof, the device being arranged so that the signal can pass through the region of relatively low opacity to the signal when the device is in use, whereby only part of the interlayer has opacity to the signal.

17. A glazing according to claim 16, wherein the interlayer is a PVB interlayer.

18. A glazing according to claim 16, wherein the glazing is an automotive glazing.

19. A glazing according claim 18, wherein the glazing is for a windscreen, a side window, a backlight, or a rooflight.

20. A glazing according to claim 16, wherein the glazing is for a building or for a part thereof.

21. An automotive vehicle or a part thereof comprising a glazing according to claim 18.

22. A building or a part thereof comprising a glazing according to claim 20.

23. A method according to claim 1, wherein the dye or pigment is dye or pigment within the thickness of the interlayer.

24. A glazing according to claim 16, wherein the dye or pigment is dye or pigment within the thickness of the interlayer.

25. A method according to claim 1, wherein the laser is used at a wavelength in the range of 100 nm to 10 µm.

26. A glazing according to claim 16, wherein the laser is used at a wavelength in the range of 300 nm to 3.5 µm.

27. A method according to claim 1, wherein the laser is used at a wavelength in the range of 100 nm to 10 µm.

28. A glazing according to claim 16, wherein the laser is used at a wavelength in the range of 300 nm to 3.5 µm.

* * * * *